United States Patent [19]

Kuchta

[11] Patent Number: 4,967,669
[45] Date of Patent: Nov. 6, 1990

[54] TRACK EXPANDER DEVICE FOR A CONVEYORIZED TRANSPORT SYSTEM

[75] Inventor: Richard Kuchta, Tolland, Conn.

[73] Assignee: Gerber Garment Technology, Inc., West Tolland, Conn.

[21] Appl. No.: 429,205

[22] Filed: Oct. 30, 1989

[51] Int. Cl.⁵ .................. E01B 25/22; B65G 23/44
[52] U.S. Cl. ............................ 104/106; 104/94; 104/172.4; 238/228; 238/249; 198/816; 403/21; 403/18
[58] Field of Search ............... 238/175, 176, 227, 228, 238/249; 104/91, 93–95, 106, 107, 110; 198/816; 403/118, 22, 21

[56] References Cited

U.S. PATENT DOCUMENTS

| 826,812 | 7/1906 | Wingren | 238/249 |
|---|---|---|---|
| 1,668,514 | 5/1928 | Kruckenberg et al. | 238/249 |
| 2,345,650 | 4/1944 | Attwood | 403/21 |
| 3,118,315 | 1/1964 | Loosi | 198/816 |
| 3,292,772 | 12/1966 | Rice | 198/816 |
| 3,332,538 | 7/1967 | Rice | 198/816 |
| 3,519,121 | 7/1970 | Baldwin et al. | 198/816 |
| 3,528,608 | 9/1970 | Dashew et al. | 238/175 |
| 3,921,793 | 11/1975 | Hutchinson et al. | 198/816 |
| 3,926,304 | 12/1975 | Watabe | 198/816 |
| 4,712,485 | 12/1987 | Nymark | 104/172.4 |
| 4,728,226 | 3/1988 | Navarro | 403/118 |
| 4,838,412 | 6/1989 | Backman | 104/94 |

Primary Examiner—Joseph F. Peters, Jr.
Assistant Examiner—R. B. Johnson
Attorney, Agent, or Firm—McCormick, Paulding & Huber

[57] ABSTRACT

A track expanding device is employed in a conveyorized transport system to spread apart adjacently disposed sections of track thereby tensioning an endless chain travelling with these track sections. The expanding device comprises a splice and an expander having a threaded member for engaging with the splice with each of the splice and the expander being connected to an associated one of the adjacently disposed track sections thereby tensioning the endless chain as the threaded member is rotated.

10 Claims, 4 Drawing Sheets

TRACK EXPANDER DEVICE FOR A CONVEYORIZED TRANSPORT SYSTEM

CROSS REFERENCE TO RELATED APPLICATION

This application relates to copending U.S. patent application Ser. No. 362,828, entitled HIGH PERFORMANCE CHAIN FOR AUTOMATED TRANSPORT SYSTEM filed on June 6, 1989 which application being commonly assigned with the assignee of the present invention.

BACKGROUND OF THE INVENTION

The present invention relates generally to an automated conveyorized transport system having an endless chain moved under power through track sections suspended above a rail to propel free traveling trolleys along the rail and, more particularly relates to an improvement in such a system wherein means are provided for expanding adjacently disposed sections of track relative to one another thereby tensioning the endless chain travelling in these track sections.

In automated transport systems of the type which this invention is concerned, an endless chain travels within a channel formed by a series of track sections positioned relative to one another in an end to end manner such that the endless chain as it moves through the channel formed by the track sections, propels trolleys from one position in the system to another. These systems are typically found in production facilities in which work pieces are carried by trolleys between a series of work stations where various work operations are performed on the work pieces or at which locations the work pieces may be moved for storage for transportation later in time. One such type of transport system is disclosed in U.S. Pat. No. 4,712,485 issued to Roland P. Nimark on Dec. 15, 1987, and which patent being currently assigned to the assignee of the present invention.

The endless chain employed in the aforesaid reference is driven by a rotary power source, such as an electric motor having a rotary drive member, which chain is moved relative to the power source by engagement of individual links with the rotary drive member As such, it is important that individual links of the chain he maintained in a linear relationship with one another to avoid jamming problems which may occur in the chain as it engages and couples with the rotary drive member. In addition, it is desirable to maintain tension in the chain as it moves through the track sections at a rapid velocity so as to avoid undesirable noise generated by rattling which may otherwise be generated by the chain as a result of slack which may exist in the loop.

Attempts have been made to remedy this problem but, these attempts have unfavorably resulted in damage occurring to the track sections. Hitherto, tensioning of the chain was accomplished by spreading adjacently disposed ends of track section in a manner such that an operator loosened connecting plates bridging the opposed track sections with one another and then inserted a prying instrument, such as an enlarged screw driver, between the ends of each track section thereby prying apart the track sections to create a slight gap and thereafter resecured the previously loosened connecting plates while simultaneously holding the prying instrument in place to maintain the gap obtained by the prying action. This method of tensioning the endless chain while being awkward, furthermore resulted in the ends of the track sections being deformed by the inserted instrument thereby disrupting the otherwise previously existing smooth interior housing through which the endless chain travels.

Accordingly, it is an object of the present invention to provide a track expander usable in a track of the aforesaid type to tension an endless chain travelling within the track by spreading adjacently disposed track sections relative to one another by means of an expander cooperating with a splice connecting adjacent track sections.

It is yet another object of the present to provide a method by which track sections may be spread one relative to the other to create tension in an endless chain travelling through the track sections.

SUMMARY OF THE INVENTION

This invention relates to a track expanding device employed with a series of track sections housing an endless chain travelling through it. The track expanding device comprises a splice connecting adjacently disposed sections of track with one another and an expander body secured to one of the involved track sections positioned adjacent the splice. The expander body and the splice combine to form take-up means engaging between the expander body and the splice such that the take-up means when appropriately manipulated spreads the involved track sections apart, in turn tensioning the endless chain housed within the track sections.

The invention further more resides in a method of utilizing the aforesaid rail expanding device to spread apart adjacently disposed track sections in a conveyorized system thereby tensioning an endless chain traveling through the sections of track.

DETAIL DESCRIPTION OF THE PREFERRED EMBODIMENT

Figure 1:
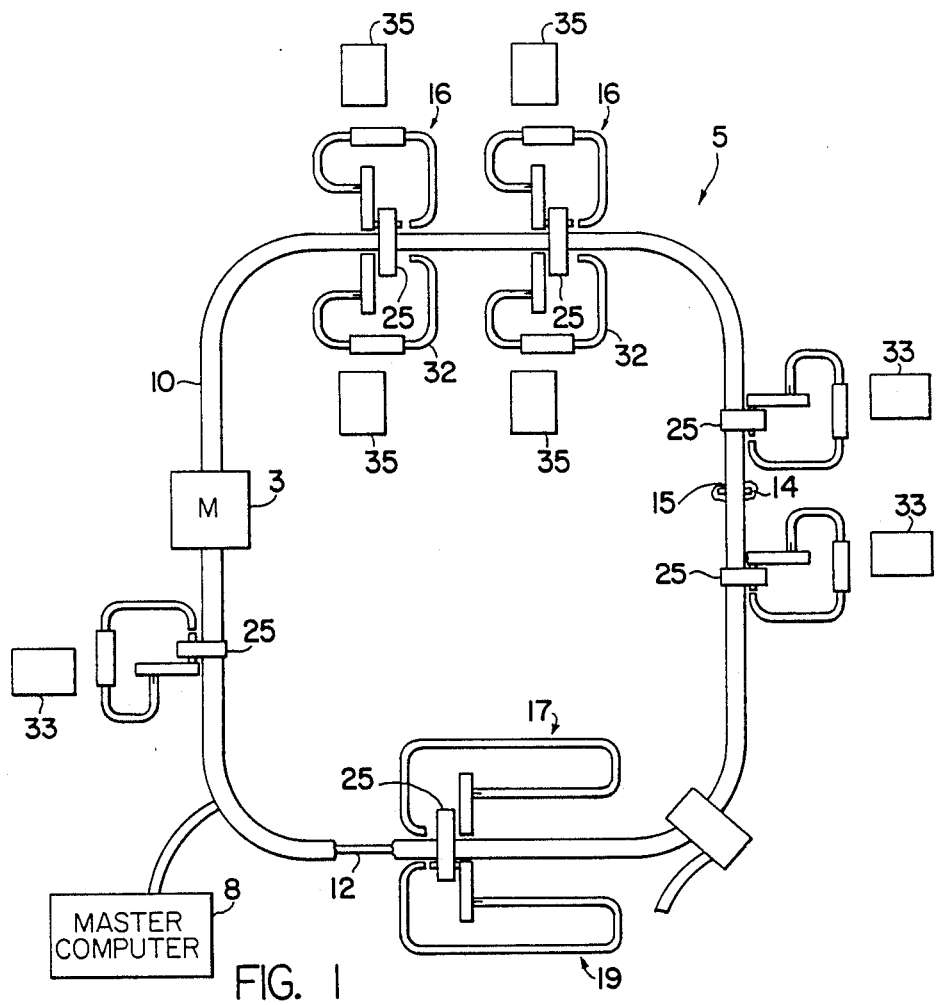
FIG. 1 is a top view of an automated transport system embodying the present invention.

Turning first to FIG. 1 an automated transport system shown generally at 5 employes the invention. The system includes a propulsion track 10 in the form of an extruded channel through which an endless chain 2 having pushers 15,15 travels under power from a motorized drive unit 3. Situated beneath the track 10 is a main rail 12 along which freely travelling trolleys 14,14 ride while being propelled by the pushers 15,15. Positioned along the track 10 along either or along both sides, such as in pair cut pairs, are subsidiary loops 16,16 and 32,32 leading to and from a work station 33 or 35 and are subsidiary loops 17 and 19 leading to storage facilities from the track 10. The automated transport system 5 further includes a master computer 8 for controlling the movements of three positions switches 25,25 which route trolleys between the main rail 12 and each pair of subsidiary loops 32,32 and 16,16 or directly between adjacently and disposed subsidiary loops pairs 32,16 and 32,16.

Figure 2:
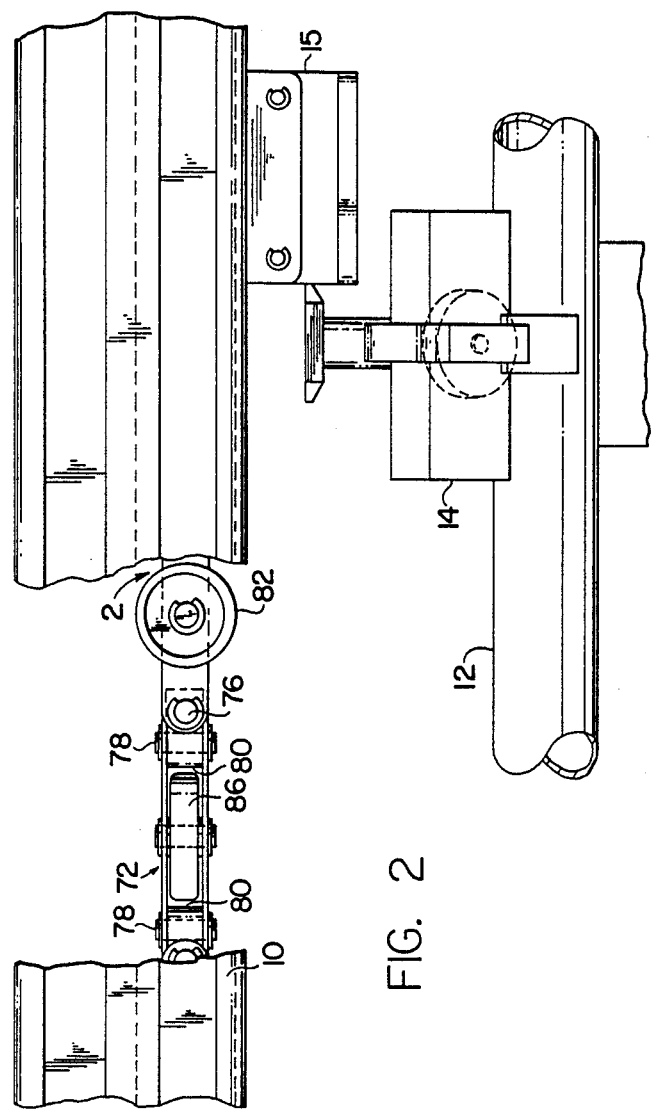
FIG. 2 is a fragmentary side elevation view of a section of track showing a chain traveling in the automated transport system of FIG. 1.
Figure 3:
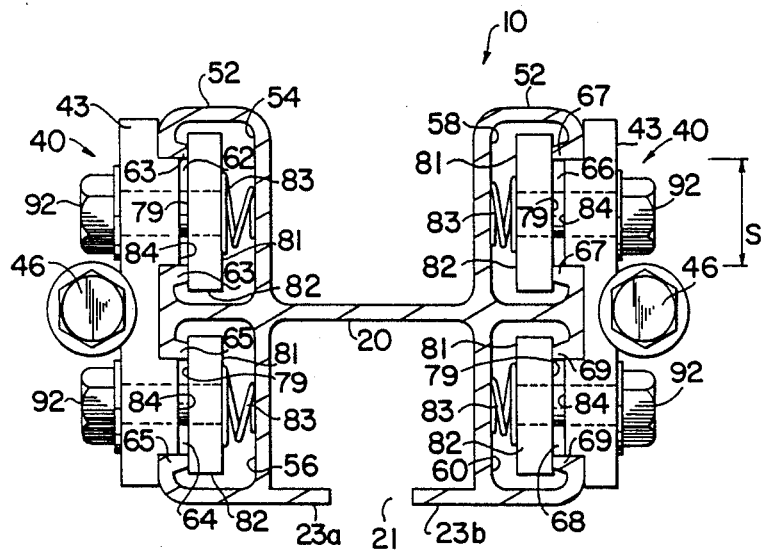
FIG. 3 is a vertical sectional view taken along line 3—3 in FIG. 4 through a section of track absent the chain.

Referring now to FIGS. 2 and 3, the endless chain 2 is comprised of vertical links 70,70 and horizontal links 72,72 with each of the vertical links 70,70 being connected in an end to end manner to an adjacently disposed one of the horizontal links 72,72 via a horizontal pin 76 and a vertical pin 78 passing through correspondingly sized vertical and horizontal openings formed in connecting linkages 80 to allow relative vertical and horizontal pivoting between the links 70 and 72 as required for the chain to follow the course of the main rail 12. As is shown in FIG. 3, the track 10 has a substantially U-shaped longitudinal extending recess 20 through which the chain 2 travels and has a slot 21 defined by two laterally disposed portions 23a and 23b such that the slot 21 extends longitudinally of the channel length and communicates between the recess 20 and the external surface of the track 10. The slot 21 is sized so as to permit the pushers 15,15 depending from the chain 2 to extend through the track 10 and engage with an involved one of the trolleys 14. As such, each of the horizontal wheels 86 cooperates with one of the side walls of the recess 20 and rotatably bears horizontal loads imposed on the chain 2 within the track 10 with the wheels 86 laterally centering the chain within the track 10. Similarly each pair of the vertical wheels 82 co-act with the upper surfaces of the laterally disposed portions 23a, 23b of the track 10 to rotationally bear the vertical loads imposed on the chain 2.

Figure 4:
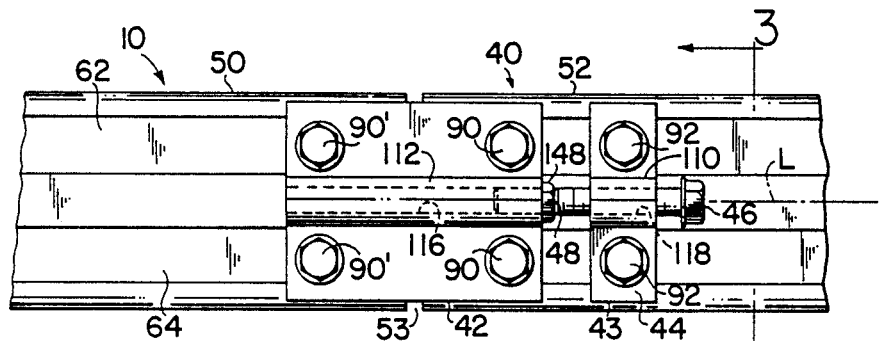
FIG. 4 is a side elevational view of two sections of track shown with the track expanding device.
Figure 5:
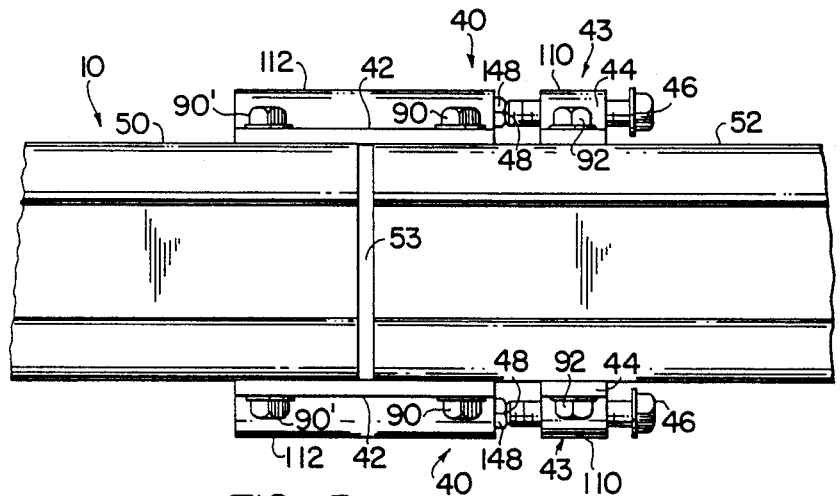
FIG. 5 is a top view showing two track expanding devices in normal use connected on both sides of adjacently disposed track sections.
Figure 6:
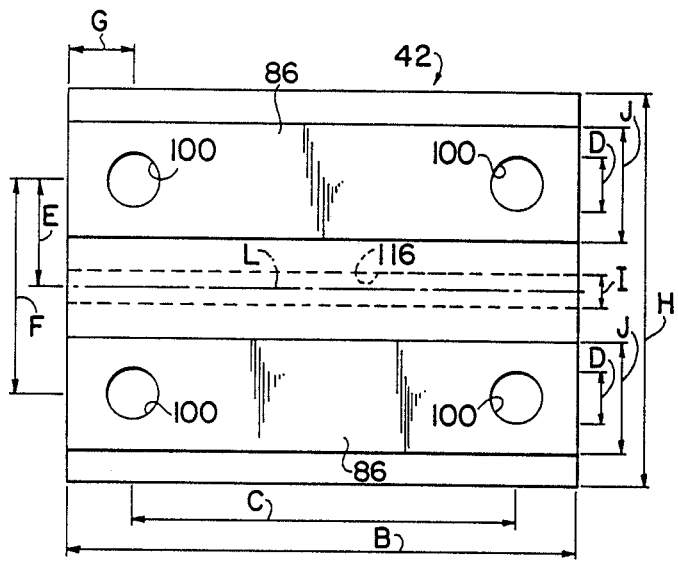
FIG. 6 is a side elevational view of a splice.
Figure 7:
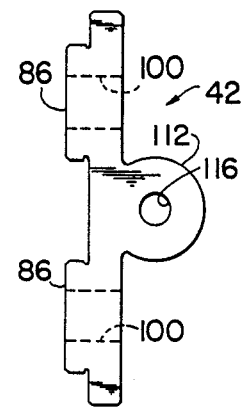
FIG. 7 is a front elevation view of the splice looking at it from the right in FIG. 6.
Figure 8:
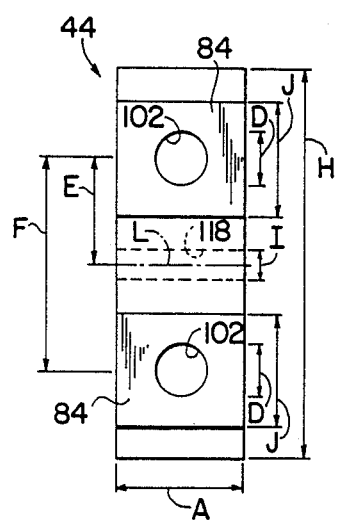
FIG. 8 is a side elevation View of the track expander body.
Figure 9:
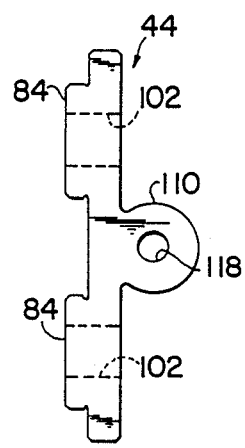
FIG. 9 is a front elevation view of the expander body looking at it from the right in FIG. 8.

In accordance with the invention, and as broadly illustrated in FIGS. 4 and 5, a track expanding device referenced generally as 40 is provided for adjustably spreading apart opposed ends of track section 50 and 52 relative to one another in order to tension an endless chain travelling within the track sections. The track expanding device 40 is comprised of a splice 42 and an expander 43 having a body 44 positionable adjacent one end of the splice 42 with the splice 42 connecting the end regions of the opposed track sections 50 and 52 and the expander body 44 being connected to the track section 52. The expander 43 further includes a take-up bolt 46 transversely threadably engaging with the body 44 and contacting an abutment 48 carried by the splice 42.

To effect connection of the splice 42 and the expander body 44 with the track 10, as best illustrated with reference again to FIG. 3, the track sections 50 and 52, each have a plurality of longitudinally extending channels 54,56 and 58,60, two of which channels being each disposed on respective opposite side walls of the track sections 50 and 52 and extending generally parallel with one another and with the recess 20. The channels 54,56 and 58,60 are laterally outwardly opened respectively defining longitudinally extending mounting slots 62,64 and 66,68 extending parallel with the channels, with the mounting slots in turn being defined by inwardly directed pairs of lips respectively indicated at 63,65, and 67,69. The lips of each pair are sufficiently spaced apart from one another by the indicated dimension S so as to be capable of receiving portions of the splice 42 and the expander body 44 as will become hereinafter apparent.

Received within the channels 54,56 and 58,60 are retaining nuts 82,82 each having a first face 79 oriented away from the track 10 and a second oppositely directed face 81. To cause the first face 79 to abut the associated ones of the lips 63,65 and 67,69 and thereby position the nut threaded opening in alignment with the associated one of the mounting slots 62,64 and 68,70, biasing elements 83,83 are each connected to the second face of each of the retaining nuts 82,82 and, acting against the back wall of the involved channel, effect the desired positioning of the retaining nuts within each of the associated channels. The biasing elements 83,83 may be formed from any number of resilient elements, but preferably take the form of helical compression springs. It should be understood that the retaining nuts 82,82 while being outwardly biased against an associated pair of the lips 63,65 and 67,69 are nevertheless slideably positionable relative to the track 10.

Referring now to FIGS. 4, and 6–8 for a detailed description of the particular configuration of the splice 42 and the expander body 44 and the manner in which they are connected for sliding movement with the track sections 50 and 52, it will be seen that portions of these elements are sized and shaped to be received within associated ones of the mounting slots 62,64 and 68,70. The expander body 44 and the splice 42 are each symmetrically shaped about axis L and are so configured so as to include outwardly projecting mounting portions, respectively, 84,84 and 86,86, extending parallel with the axis L with each of the mounting portions 84,86 having a width J slightly smaller in dimension than that of the lip spacing S. Openings 100,100 are formed in the splice 42 and are sized to receive a first set of bolts 90',90' and a second set of bolts 90,90 for respectively connecting the splice 42 with each of the track sections 50 and 52 in a manner that will hereinafter be discussed. Also, openings 102,102 are formed in the expander body 44 and are sized to receive a third set of bolts 92,92 such that these bolts and those associated with the openings 100, 100 communicate through the splice and the expander body and threadedly engage with corresponding ones of the retaining nuts 82,82. The mounting portions 84,84 and 86,86 respectively create with the expander body 44 and the splice 42 engagement surfaces 100,100 and 102,102 such that tightening of the bolt sets 90,90, 90',90' and 92,92 draws these surfaces against the track 10 thereby fixably locking them against movement relative to it. By way of example, the splice 42 and the expander body 44 are made of aluminum and have the following dimensions:

A=1.0 (all dimensions in inches)
B=4.0
C=3.0
D=0.406 (Diameter)
E=0.812
F=1.625
G=0.5
H=3.0
I=0.375 (Diameter)
J=0.907

Also, it should be appreciated that the track sections 50 and 52 are suspended in the system such that there is enough play or room for adjustment in the suspending structure allowing for the creation of slight gaps measuring about one eighth inch or so between opposed track sections.

To effect spreading of the track sections 50 and 52, the expander body 44 and a splice 42 each respectively have a raised intermediate central portions 110 and 112 such that the raised intermediate portion 110 of the expander body receives the take-up bolt 46 within a correspondingly threaded opening 118 formed in it, while the raised intermediate central portion 112 of the splice 42 has a through transversely extending opening 116 receiving a headed stop bolt 148 providing the abutment 48 into which the engaging end of the take-up bolt 46 contacts. It should be noted that the raised intermediate central portions 110 and 112 are aligned with one another along the axis L when the splice 42 and the expander body 44 are mounted to the track sections 50 and 52. Also, the opening 116 and the headed stop bolt 148 need not threadedly engage one another, but rather may be relatively sized such that the bolt 148 slides freely yet is supported along its length within the opening 116.

Referring once again to FIGS. 4 and 5, and in particular to the method of using the expanding device 40, it should be apparent that two splices 44,44 are first mounted on either side of the track sections 50 and 52 with the bolt sets 90',90' and 90,90 loosely engaging with corresponding ones of the retaining nuts 82,82 to generally join the track sections 50 and 52 with one another. The first bolt set 90',90' is then fully tightened thus securing the left portion of the splice 42 to the track section 50. Meanwhile, the second bolt set 90,90 is maintained in a loosened state such that the right portion of the splice 42 associated with the track section 52 is capable of moving relative to it. The expander 43 is secured to the track section 52 by fully tightening the third bolt set 92,92 associated with the expander 43 thereby fixing it in a spatial relationship relative to the splice 42. At this point, the takeup bolt 46 is accordingly rotated to move its engagement end against the abutment 48 and consequently spread the section 52 relative to the opposing section. Once the appropriate gap 53 is achieved, the second bolt set 90,90 is subsequently tightened and the rail sections 50 and 52 are thereafter maintained in the desired spatial relationship relative to one another. This process is again repeated for the expanding device located on the opposite side of the track !0 and the entire process may then again be successively repeated at each subsequent juncture between track sections until the appropriate tension in the chain 2 is accomplished. It is noted that while the foregoing description begins the tensioning process with a mounting operation of the splices to the track sections, in actual use, it may be necessary to increase chain tension after the splices are in place and the chain has been initially tensioned. To this end, the second bolt set 90,90 may simply be loosened followed by the take-up bolt 46 being rotated to further spread the track sections apart with the second bolt set 90,90 thereafter being retightened to maintain the newly created spacing.

By the foregoing a rail expander has been disclosed in the preferred embodiment for creating tension in an endless chain traveling within individual track sections. However, many modifications and substitution may be had without departing from the spirit of the invention. For example, while in the preferred embodiment of the invention, the expander body 44 carries the take-up bolt engaging against the splice 42, it is altogether possible to reverse this orientation of parts such that the splice 42 carries the take-up bolt and abuts against the expander 43. Also, the biasing springs 80 may take the form of a simple leaf spring as opposed to the helical form shown in FIG. 5. Accordingly, the invention has been describe by way of illustration rather than limitation.

I claim:

1. In a conveyorized transport system of the type in which a plurality of track sections are arranged end to end with one another having an endless chain adapted to travel along said track sections and said chain having a plurality of pushers for engaging workpiece carriers freely traveling on rail means, a track expanding device comprising;
   a splice configured for connection with adjacently disposed ends of a first track section and a second track section;
   said splice having first and second connecting means for adjustably securing it against movement relative to said first and said second track sections;
   an expander body spaced from said splice and configured for connection with either of said first and said second track sections adjacent said splice;
   take-up means interposed between said expander body and said splice for moving said splice relative to said expander body;
   said first connecting means operatively connecting said splice to said first track section and the second connecting means operatively connecting said splice to said second track section;
   said take-up means including a threaded take-up member and an abutment;
   said expander body having a tranversely extending threaded opening receiving said threaded take-up member therein;
   said abutment being carried by said splice and being positioned with said splice generally adjacent the end of said second track section; and
   wherein said threaded take-up member has a first end having means for rotating it relative to said expander body and an opposite engagement end contacting said abutment.

2. A track expanding device as defined in claim 1 further characterized in that said
   threaded take-up member is a bolt and said means for rotating said threaded take-up member is the headed end of said bolt.

3. A track expanding device as defined in claim 2 further characterized in that each of said first and second track sections has a plurality of longitudinally extending channels opening outwardly of the track sections and defining longitudinally extending mounting slots; and
   wherein said splice and said expander body each having mounting portions sized and shaped to be received respectively within an associated one of said mounting slots.

4. A track expanding device as defined in claim 3 further characterized in that said first and said second connecting means includes a plurality of retaining nuts slidably received within each of said channels;
   said first and second connecting means including through openings formed in said splice and a first and a second set of threaded bolts with each bolt extending through one of said through openings formed in said splice and engaging with an associated one of said retaining nuts thereby connecting said splice with the track sections.

5. A track expanding device as defined in claim 4 further characterized in that said expander body is secured to said second track section by a third connecting means;

said third connecting means including through openings formed in said expander body and further includes a third set of threaded bolts and associated retaining nuts received within said channels with each bolt of said third set extending through one of said through openings formed in said body and engaging with an associated one of said retaining nuts thereby securing said expander body to said second track section.

6. A track expanding device as defined in claim 5 further characterized in that said splice and said expander body each have an intermediate raised central portion;

said transversely extending threaded opening being formed in said intermediate raised central portion of said expander body, and wherein said raised central portion of said splice includes said abutment.

7. A track expanding device as defined in claim 6 further characterized in that said longitudinally extending mounting slots are defined by pairs of inwardly directed lips engaging with said retaining nuts; and wherein said mounting portions of said expander body and said splice being sized and configured to be received between respective pairs of said lips.

8. A track expanding device as defined in claim 7 further characterized in that said abutment comprises the head of a bolt received within a transverse opening formed in said intermediate raised central portion of said splice; and wherein the intermediate raised central portions of said expander body and said splice are in alignment with each other.

9. A track expanding device as defined in claim 7 further characterized in that said retaining nuts are biased outwardly against said lip pairs by helical spring elements.

10. A track expanding device as defined in claim 9 further characterized in that said splice, said expander body and said track sections are formed from aluminum.

* * * * *